United States Patent [19]

Fischer

[11] 4,221,028
[45] Sep. 9, 1980

[54] ARRANGEMENT FOR MOUNTING A FLEXIBLE FILM OR THE LIKE

[76] Inventor: Artur Fischer, D-7244 Waldachtal 3, Tumlingen, Waldachtal, Fed. Rep. of Germany

[21] Appl. No.: 40,277

[22] Filed: May 18, 1979

[30] Foreign Application Priority Data

Jun. 20, 1978 [DE] Fed. Rep. of Germany ....... 2826969

[51] Int. Cl.² .............................................. E04B 1/40
[52] U.S. Cl. ................................ 24/245 R; 24/201 A
[58] Field of Search ................... 24/90 C, 246, 245 R, 24/256, 201 A

[56] References Cited

U.S. PATENT DOCUMENTS

| | | | |
|---|---|---|---|
| 535,377 | 3/1895 | Jackson | 24/245 R |
| 595,032 | 12/1897 | Allen | 24/246 |
| 1,399,730 | 12/1921 | Abe | 24/245 R |
| 1,682,771 | 9/1928 | Butler | 24/90 C UX |
| 2,058,416 | 10/1936 | Comstock | 24/256 UX |
| 2,472,235 | 6/1949 | Sullivan | 24/245 R |
| 3,237,904 | 3/1966 | Abruzese | 24/245 R |
| 3,283,383 | 11/1966 | Heath | 24/245 R |

Primary Examiner—Andrew V. Kundrat
Attorney, Agent, or Firm—Michael J. Striker

[57] ABSTRACT

An arrangement for mounting a film to a substrate has an inner clamping member which is connected to the substrate and has an undercut portion, and an outer clamping member which surrounds the film placed on the inner member in the region of the undercut portion of the inner clamping so that the film is clamped between the inner clamping member and the outer clamping member. The outer clamping member is formed as an open spring ring. It may have two end projections which are bent from each other so as to facilitate engagement of the ring by pliers. A locking member may be fitted over the end projections of the spring ring. The spring ring may be coated by a synthetic plastic material.

11 Claims, 2 Drawing Figures

ARRANGEMENT FOR MOUNTING A FLEXIBLE FILM OR THE LIKE

BACKGROUND OF THE INVENTION

The present invention relates to an arrangement for mounting a flexible film or the like, particularly for sealing a substrate.

Mechanical mounting of a cover sheet or film is utilized when mounting of the same by placing a ballast onto the sheet or film is unacceptable because the ballast performs high surface loading. A known method of mechanical mounting of a film to a substrate includes clamping of the film to the latter. A through-going opening is drilled in the film and the substrate, and a mounting element is inserted into the thus-drilled opening. It has been shown in practice that under the action of even small load the sheet or film is often torn in the region of the through-going opening and no longer performs its sealing functions. It is also possible that the sheet or film is deformed under the action of deleterious weather conditions in the region in which it is pressed by the clamping plate to the substrate whereby again the sealing problems take place.

SUMMARY OF THE INVENTION

Accordingly, it is an object of the present invention to provide an arrangement which avoids the disadvantages of the prior art.

More particularly, it is an object of the present invention to provide an arrangement which makes possible mounting of a film on a substrate without damaging the film and thereby impairing its sealing characteristics.

In keeping with these objects and with others which will become apparent hereinafter, one feature of the present invention resides, briefly stated, in an arrangement which has an inner clamping member connected with a substrate and having an outer surface onto which a film is placed and an undercut portion adjacent to the object, and an outer clamping member surrounding the film in the region of the undercut portion of the inner clamping member so that the film is clamped between the inner and outer clamping members. The outer clamping member is advantageously formed as an open spring ring which is engageable in the undercut portion of the inner clamping member from outside of the film.

The above-described clamping of the film by means of the inner clamping member connected with the substrate, and the outer clamping member formed as the spring ring, exerts only a small surface loading onto the film so that danger of tearing off of the film is very small. The inventive arrangement makes possible mounting of the film without drilling a through-going opening in the same. Thereby, no sealing problems take place. The inner clamping member is mounted on the floor structure before fitting the film, which mounting can be performed, for example, by a dowel. When the film is placed on the inner clamping member, the spring ring is fitted onto the inner clamping member from outside of the film. The inner clamping member is protuberance-shaped and raised, and thereby it can be easily found for fitting purposes.

In accordance with another feature of the present invention, the undercut portion of the inner clamping member is formed with a cross section which decreases in the direction toward the substrate. The inner clamping member has another portion with a cross section decreasing in a direction away from the object.

A further advantageous feature of the present invention is that the spring ring is open and has projections at its ends, which projections are bent outwardly in a direction away from each other. These projections make possible engagement of the spring ring by pliers which makes easier fitting of the spring ring onto the inner clamping member.

In accordance with still a further feature of the present invention, a circumferentially closed locking member may be fitted onto both bent projections of the spring ring. In such a construction, disengagement of the spring ring from the undercut portion of the inner clamping member under the action of inherent tension of the film, is prevented.

Since the spring ring is open to the action of wheather, it is advantageous to produce the spring ring of rustproof steel or, in accordance with an additional feature of the present invention, to coat the spring ring completely by a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
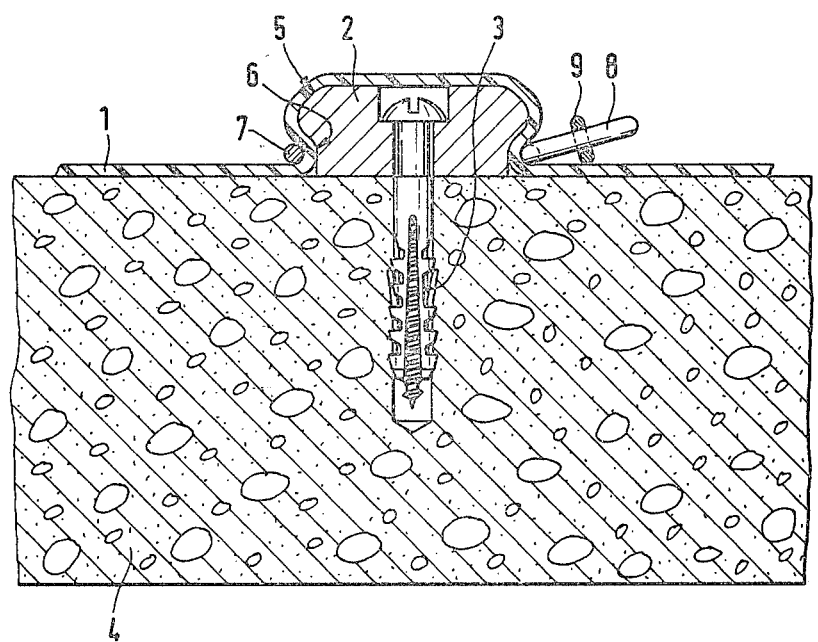
FIG. 1 is a section of an arrangement for mounting a film to a floor structure, in accordance with the present invention.
Figure 2:
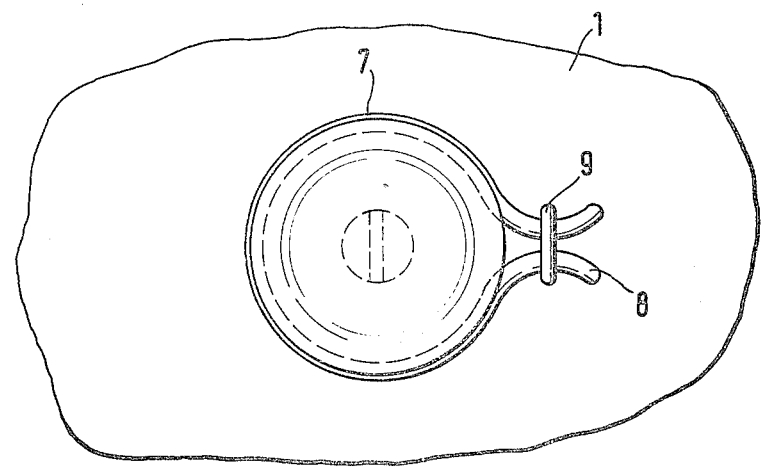
FIG. 2 is a plan view of the inventive arrangement.

An arrangement for mounting a film 1 to a substrate 4 has an inner clamping member which is identified by reference numeral 2. The inner clamping member 2 is connected with the substrate 4 by a mounting element 3, such as a dowel. The inner clamping member 2 has an outer surface whose outer portion 5 spaced from the substrate is inclined. More particularly, the portion 5 has a cross section which decreases in a direction away from the substrate 4. The inner clamping member 2 further has an inner portion 6 which is located adjacent to the substrate 4 and is undercut. More particularly, the undercut portion 6 has a cross section which is smaller than the maximum cross section of the inner clamping member 2. As can be seen from the drawing, the portion 6 has at least a section whose cross section decreases in a direction toward the substrate 4.

The film 1 is fitted over the inner clamping member 2 which is connected with the substrate 4. Then, an outer clamping member is fitted over the film 1 in the region of the undercut portion 6 of the inner clamping member 2. The outer clamping member is formed as an open spring ring 7. Because of the spring action of the spring ring 7, it is arrested in the undercut portion 6 of the inner clamping member 2 from outside of the film 1, and thereby the film 1 is firmly clamped between the inner clamping member 2 and the spring ring 7.

The spring ring 7 has projections 8 at its ends, which projections 8 are bent outwardly. In other words, they are bent in directions away from one another or in diametrically opposite directions relative to an axis of the spring ring. The projections 8 are provided for easier bending of the spring ring with the aid of pliers.

After engagement of the spring ring 7 in the undercut portion 6 of the inner clamping member 2, a locking member 9 can be fitted over the projections 8 of the spring ring 7. This ensures securing of the spring ring 7 against expanding in the case of high inherent tension of the film 1. The locking member 9 is formed as a cicumferentially closed ring. The corrosion-resistance of the spring ring 7 and the locking member 9 can be attained by manufacturing them of rustproof steel or by coating of the spring ring 7 and the locking member 9 by a synthetic plastic material.

It will be understood that each of the elements described above, or two or more together, may also find a useful application in other types of constructions differing from the types described above.

While the invention has been illustrated and described as embodied in an arrangement for mounting a film it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for mounting a flexible film or the like, particularly to seal a substrate, comprising an inner clamping member connected with a substrate and having a relatively large outer surface on which a film is placed and an undercut portion with also a relatively large outer surface; means for connecting said inner clamping member with the substrate and formed by a connecting element which is separate from and has an outer surface which is considerably smaller than that of said inner clamping member; and an outer clamping member formed by a metallic corrosion-resistant spring ring which has a relatively small circular cross-section and relatively large diameter and inner circumferential surface and surrounds the film in the region of said undercut portion of said inner clamping member, so that the film is easily clamped by and firmly held between said clamping members over a large surface of the film without being damaged or loosened.

2. An arrangement as defined in claim 1, wherein said spring ring is constituted of rust-proof steel.

3. An arrangement as defined in claim 1, wherein said inner clamping member has a predetermined maximum transverse dimension, said undercut portion having a transverse dimension which is smaller than said maximum transverse dimension.

4. An arrangement as defined in claim 3, wherein said undercut portion of said inner clamping member has a section which has a cross section decreasing in a direction toward the substrate.

5. An arrangement as defined in claim 4, wherein said outer portion of said inner clamping member is spaced from said first-mentioned portion in a direction away from the substrate and has a cross section reducing in the latter-mentioned direction.

6. An arrangement as defined in claim 1, wherein said spring ring is open.

7. An arrangement as defined in claim 6, wherein said open spring ring has two end and two projections at said ends which are bent in a direction away from one another.

8. An arrangement as defined in claim 7, wherein said spring ring has an axis, said projections of said spring ring being bent in diametrically opposite directions.

9. An arrangement as defined in claim 7; and further comprising a locking member which is fitted simultaneously onto both said projections of said spring ring.

10. An arrangement as defined in claim 9, wherein said locking member is circumferentially closed.

11. An arrangement as defined in claim 1, wherein said spring ring is coated by a synthetic plastic material.

* * * * *